US011983797B2

(12) United States Patent
Watanabe

(10) Patent No.: US 11,983,797 B2
(45) Date of Patent: *May 14, 2024

(54) IMAGE COLORING APPARATUS, IMAGE COLORING METHOD, IMAGE LEARNING APPARATUS, IMAGE LEARNING METHOD, COMPUTER PROGRAM, AND IMAGE COLORING SYSTEM

(71) Applicant: Sony Group Corporation, Tokyo (JP)

(72) Inventor: Shinji Watanabe, Tokyo (JP)

(73) Assignee: Sony Group Corporation, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 17/684,342

(22) Filed: Mar. 1, 2022

(65) Prior Publication Data
US 2022/0270305 A1  Aug. 25, 2022

Related U.S. Application Data

(63) Continuation of application No. 16/766,454, filed as application No. PCT/JP2018/036845 on Oct. 2, 2018, now Pat. No. 11,321,881.

(30) Foreign Application Priority Data

Dec. 1, 2017  (JP) .................... 2017-231403

(51) Int. Cl.
G06T 11/00  (2006.01)
G06N 3/08  (2023.01)
(Continued)

(52) U.S. Cl.
CPC ............. *G06T 11/001* (2013.01); *G06N 3/08* (2013.01); *G06T 5/50* (2013.01); *G06T 7/0012* (2013.01);
(Continued)

(58) Field of Classification Search
CPC ........... G06N 3/08; G06T 11/001; G06T 5/50; G06T 7/0012; G06T 2207/10064; G06T 2207/30024
See application file for complete search history.

(56) References Cited

U.S. PATENT DOCUMENTS 8,269,827 B2  9/2012  Can et al.
8,725,237 B2  5/2014  Bryant-Greenwood et al.
(Continued)

FOREIGN PATENT DOCUMENTS

CN  1808292 A  7/2006
CN  102023148 A  4/2011
(Continued)

OTHER PUBLICATIONS

International Search Report and English translation thereof dated Jan. 8, 2019 in connection with International Application No. PCT/JP2018/036845.
(Continued)

Primary Examiner — Sing-Wai Wu
(74) Attorney, Agent, or Firm — Wolf, Greenfield & Sacks, P.C.

(57) ABSTRACT

[Problem] To highly accurately color a target image based on information such as morphological features and shapes in the target image.
[Solution] According to the present disclosure, an image coloring apparatus is provided. The image coloring apparatus includes: an acquisition unit configured to acquire a decolored image that is decolored; and a coloring unit configured to, based on morphological information obtained from the decolored image, with reference to learning result information obtained as a result of previously learning correspondence between the morphological information and color information, color the decolored image using a color that corresponds to the morphological information. This (Continued)

configuration enables a target image to be highly accurately colored based on information such as morphological features and shapes in the target image.

17 Claims, 6 Drawing Sheets

(51) Int. Cl.
*G06T 5/50* (2006.01)
*G06T 7/00* (2017.01)
(52) U.S. Cl.
CPC .............. *G06T 2207/10064* (2013.01); *G06T 2207/30024* (2013.01)

(56) References Cited

U.S. PATENT DOCUMENTS

| | | |
|---|---|---|
| 9,036,889 B2 | 5/2015 | Liu et al. |
| 2009/0212242 A1 | 8/2009 | Yamada |
| 2010/0085372 A1 | 4/2010 | Levin |
| 2011/0057946 A1 | 3/2011 | Yamamoto |
| 2011/0074944 A1 | 3/2011 | Can |
| 2015/0228053 A1 | 8/2015 | Ohashi |
| 2020/0294278 A1 | 9/2020 | Watanabe |

FOREIGN PATENT DOCUMENTS

| | | |
|---|---|---|
| JP | 2009-014355 A | 1/2009 |
| JP | 2011-053074 A | 3/2011 |
| JP | 2016-028250 A | 2/2016 |
| WO | WO 2011/163624 A1 | 12/2011 |
| WO | WO-2014038408 A1 | 3/2014 |

OTHER PUBLICATIONS

International Written Opinion and English translation thereof dated Jan. 8, 2019 in connection with International Application No. PCT/JP2018/036845.
International Preliminary Report on Patentability and English translation thereof dated Jun. 11, 2020 in connection with International Application No. PCT/JP2018/036845.
Extended European Search Report dated Jan. 14, 2021 in connection with European Application No. 18882883.4.
[No Author Listed], CAMELYON16—Grand Challenge. 2016. 5 pages. URL:https://camelyon16.grand-challenge.org [retrieved on Aug. 27, 2021].
Cho et al., Neural Stain-Style Transfer Learning using GAN for Histopathological Images. arxiv.org, Cornell University Library. JMLR: Workshop and Conference Proceedings 80:1-10, Oct. 2017, XP081401668.
Vahadane et al., Structure-Preserving Color Normalization and Sparse Stain Separation for Histological Images. IEEE Transactions on Medical Imaging. vol. 35(8), Aug. 1, 2016 (Aug. 1, 2016), pp. 1962-1971, XP011618025.

IMAGE COLORING APPARATUS, IMAGE COLORING METHOD, IMAGE LEARNING APPARATUS, IMAGE LEARNING METHOD, COMPUTER PROGRAM, AND IMAGE COLORING SYSTEM

CROSS-REFERENCE TO RELATED APPLICATIONS

The present application claims the benefit under 35 U.S.C. § 120 as a continuation application of U.S. application Ser. No. 16/766,454, filed on May 22, 2020, now U.S. Pat. No. 11,321,881, which claims the benefit under 35 U.S.C. § 371 as a U.S. National Stage Entry of International Application No. PCT/JP2018/036845, filed in the Japanese Patent Office as a Receiving Office on Oct. 2, 2018, which claims priority to Japanese Patent Application Number JP2017-231403, filed in the Japanese Patent Office on Dec. 1, 2017, each of which applications is hereby incorporated by reference in its entirety.

FIELD

The present disclosure relates to an image coloring apparatus, an image coloring method, an image learning apparatus, an image learning method, a computer program, and an image coloring system.

BACKGROUND

Conventionally, for example, Patent Literature 1 below describes a technique for approximating the dye amount distribution of a stained sample image to the dye amount distribution of a standard sample image to adequately correct a dye amount of each image position in a stained sample image. Patent Literature 2 below describes a technique for performing stain separation processing through vector analysis performed on a pathological image.

CITATION LIST

Patent Literature

Patent Literature 1: Japanese Patent Application Laid-open No. 2009-014355
Patent Literature 2: Specification of U.S. Pat. No. 9,036,889

SUMMARY

Technical Problem

With the technique described in Patent Literature 1, however, it is difficult to apply a desired color in accordance with morphological features and shapes in a target image because dye amounts are corrected based on comparison of features of the distribution shape of the dye amount distribution of a target image with features of the distribution shape of the dye amount distribution of a standard sample class.

Given that difficulty, there has been a demand for highly accurately coloring a target image based on information such as morphological features and shapes in the target image.

Solution to Problem

According to the present disclosure, an image coloring apparatus is provided that includes: an acquisition unit configured to acquire a decolored image that is decolored; and a coloring unit configured to, based on morphological information obtained from the decolored image, with reference to learning result information obtained as a result of previously learning correspondence between the morphological information and color information, color the decolored image using a color that corresponds to the morphological information.

According to the present disclosure, an image coloring method is provided that includes: acquiring a decolored image that is decolored; and based on morphological information obtained from the decolored image, with reference to learning result information obtained as a result of previously learning correspondence between the morphological information and color information, coloring the decolored image using a color that corresponds to the morphological information.

According to the present disclosure, a computer program is provided that causes a computer to function as: a unit configured to acquire a decolored image that is decolored; and a unit configured to, based on morphological information obtained from the decolored image, with reference to learning result information obtained as a result of previously learning correspondence between the morphological information and color information, color the decolored image using a color that corresponds to the morphological information.

According to the present disclosure, an image learning apparatus is provided that includes: a decoloration processing unit configured to perform decoloration processing on individual colored learning-use images; and a learning unit configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

According to the present disclosure, an image learning method is provided that includes: performing decoloration processing on individual colored learning-use images; and learning morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

According to the present disclosure, a computer program is provided that causes a computer to function as: a unit configured to perform decoloration processing on individual colored learning-use images; and a unit configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

According to the present disclosure, an image coloring system is provided that includes: an image learning apparatus including a decoloration processing unit and a learning unit, the decoloration processing unit being configured to perform decoloration processing on individual colored learning-use images, the learning unit being configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon; and an image coloring apparatus including an acquisition unit and a coloring unit, the acquisition unit being configured to acquire a decolored image that is decolored, the coloring unit being configured to, based on morphological information obtained from the decolored image, with reference to learning result information obtained from the learning unit, color the decolored image using a color that corresponds to the morphological information.

Advantageous Effects of Invention

As described above, highly accurately coloring a target image based on information such as morphological features and shapes in a target image is enabled according to the present disclosure.

The above effect is not necessarily limiting, and any effect described in the present specification or another effect that can be understood from the present specification may be produced together with the above effect or instead of the above effect.

DESCRIPTION OF EMBODIMENT

The following describes a preferred embodiment of the present disclosure in detail according to the accompanying drawings. In the present specification and the drawings, the same reference sign is used for constituent elements that have substantially the same functional configuration, and overlapping descriptions are thus omitted.

The descriptions are given in the following order:
1. Configuration Example of System
2. Specific Examples of Coloration Processing by System According to Present Embodiment
   2.1. Color Conversion on Bright-Field Image
   2.2. Color Conversion on Fluorescence Image
   2.3. Case of Bright-Field Image of Sample Containing Artifact
3. Examples of Display Application 1. Configuration Example of System The present disclosure relates to a method for performing color conversion of an image using machine learning. Examples of a target image include pathological images such as a pathological stained image. In the present embodiment, a description is given particularly of a technique for automatically and highly accurately coloring cell nuclei, other cell areas, and tissue areas using positions of dye and information on staining from pathological images when colors of a pathological stained image are converted.

Figure 1:
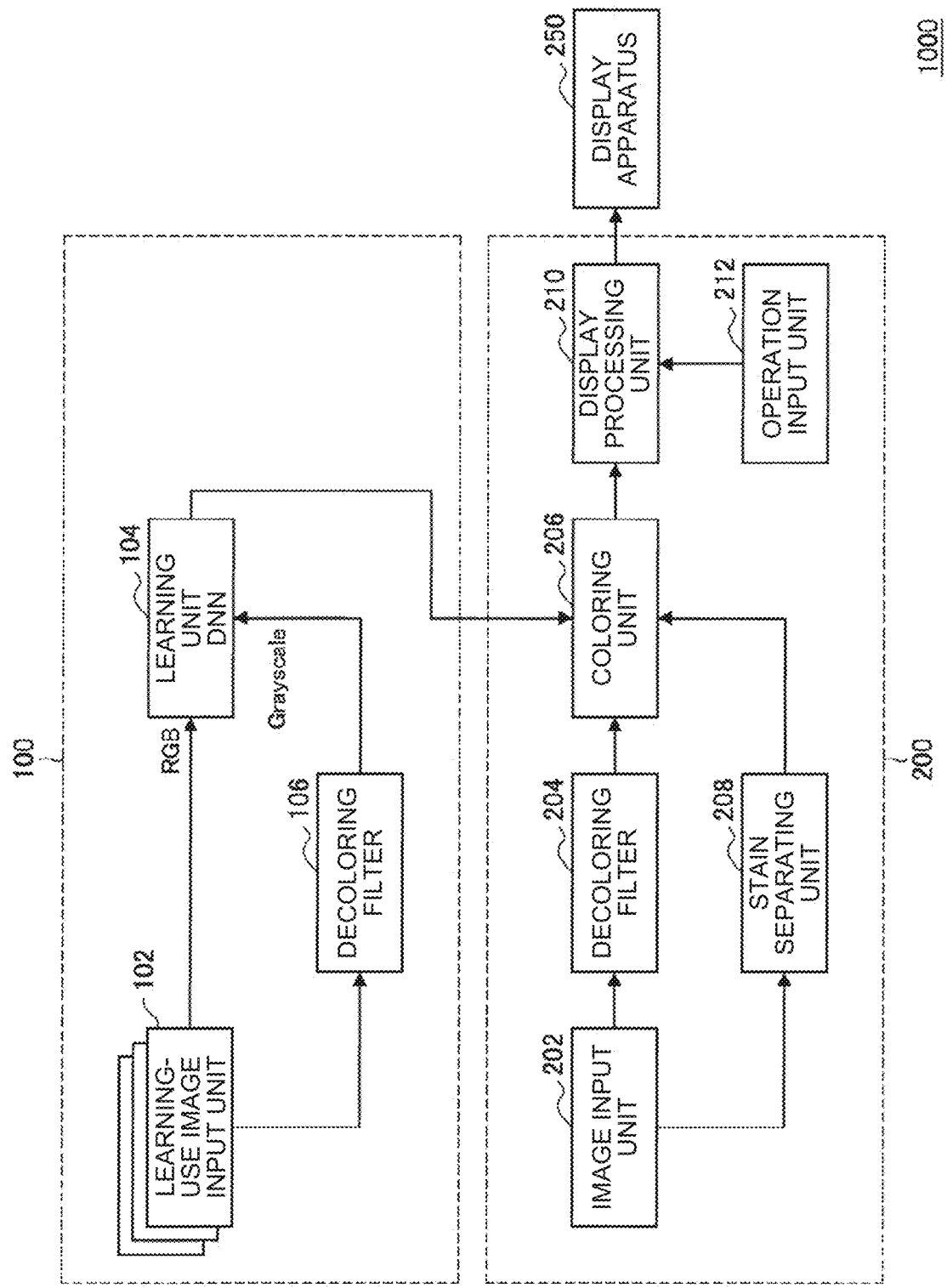
FIG. 1 is a schematic view illustrating the configuration of a system according to an embodiment of the present disclosure.

FIG. 1 is a schematic view illustrating the configuration of a system 1000 according to an embodiment of the present disclosure. As illustrated in FIG. 1, this system 1000 includes a learning device 100, a color converting device 200, and a display apparatus 250. The learning device 100 includes a learning-use image input unit 102, a learning unit 104, and a decoloring filter 106.

Red, green, and blue (RGB) image data of a learning-use image (reference image) is input to the learning-use image input unit 102. The learning-use image is, for example, a pathological stained image as described above. The learning-use image input to the learning-use image input unit 102 is input to the learning unit 104. The decoloring filter 106 performs decoloration processing on the learning-use image input to the learning-use image input unit 102. Gray-scale image data is obtained through the decoloration processing. The gray-scale image data is input to the learning unit 104. Using a plurality of such learning-use images input thereto, the learning unit 104 learns information (referred to as morphological information hereinbelow) on morphological features and shapes in the gray-scale images and corresponding colors of the RGB data. The morphological features include textures and gray levels.

Instead of gray-scale images, edge images may be used. When edge images are to be used, processing for detecting edges from the RGB data is performed, and resultant edge images are input to the learning unit 104. The learning unit 104 learns information on the edge images and corresponding colors of the RGB data. That is, the decoloring filter 106 functions as a decoloration processing unit that removes colors from learning-use images.

For learning by the learning unit 104, deep learning can be used. Deep learning is a machine learning technique using a multilayer neural network (deep neural network (DNN)). It is desirable that each of the learning-use images include areas of a cell nucleus, a fiber, a blood cell, fat, a bacterium, and the like. The learning device 100 that is unlikely to result in false colors can be configured by limiting, to pathological stained images, the learning-use images input thereto in the process of learning.

Figure 2:
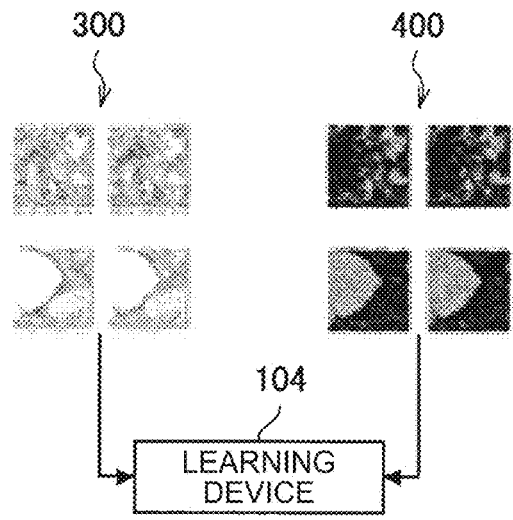
FIG. 2 is a schematic view illustrating an example of data of a learning-use image.

FIG. 2 is a schematic view illustrating an example of data of a learning-use image and illustrates, pixel by pixel, gray-scale image data 300 obtained through the decoloration processing by the decoloring filter 106 and RGB image data 400 that is the learning-use image itself. FIG. 2 illustrates, in the left side thereof, the gray-scale image data 300 that provides morphological information. FIG. 2 also illustrates, in the right side thereof, the image data 400 that corresponds to the gray-scale image data 300 and provides ideal color information as a correct solution. The learning unit 104 thus learns, with respect to each pixel, the color of the pixel from information on an arbitrary morphological feature and a shape. In the present embodiment, the learning unit 104 basically learns only characteristic colors resulting from staining in the case such as those observed in pathological images. Characteristic colors resulting from staining in pathological images are about two to three colors in the case of a bright field. In order to increase the number of kinds of staining that needs to be subjected to color conversion, it is desirable that a plurality of the learning devices 100 be provided.

As a result of the learning by the learning unit 104, learning result information is obtained in which morphological information and color information on the individual learning-use images are associated with each other. The learning result information is transmitted to a coloring unit 206 in the coloring device 200.

The color converting device 200 includes an image input unit 202, a decoloring filter 204, the coloring unit 206, a stain separating unit 208, a display processing unit 210, and an operation input unit 212. Each constituent element of the learning device 100 and the color converting device 200 illustrated in FIG. 1 can be composed of: a circuit (hardware) or a central processor such as a central processing unit (CPU); and a computer program (software) for causing the circuit or the central processor to function.

An input image to be colored is input to the image input unit 202. The input image is transmitted to the decoloring filter 204. The decoloring filter 204 performs decoloration processing on the input image to generate a gray-scale image. Instead of a gray-scale image, an edge image may be used. In such a case, the edge image is detected from the input image. The decoloring filter 204 may function as a decoloration processing unit that removes colors from the learning-use images and have the function to detect edges. When the input image is a fluorescence image, there is no need for the decoloring filter 204 to perform processing because the fluorescence image is a gray-scale image. The image input unit 202 or the decoloring filter 204 functions as an acquisition unit that acquires a decolored image. It is preferable that an element identical to one used for the decoloring filter 106 in the learning device 100 be used for the decoloring filter 204 in the color converting device 200. When the input image has a blurred area or the like, however, the decoloring filter 204 may apply an edge enhancing filter to the input image as preprocessing thereon.

A gray-scale image for the input image is obtained by applying the decoloring filter 204 to the input image. The gray-scale image thus obtained is input to the coloring unit 206. In parallel to the decoloration processing performed by the decoloring filter 204, the stain separating unit 208 performs stain separation processing on the input image. The stain separating unit 208 uses a technique described in Patent Literature 2 above and separates colors of the input image based on stain vectors that represent features of colors of the image. The stain separation processing enables cell nuclei to be discriminated from areas other than the nuclei.

The coloring unit 206 applies morphological information on the input gray-scale image to the learning result information obtained from the learning unit 104, thereby acquiring color information corresponding to the morphological information. The coloring unit 206 then colors the gray-scale image using the color information corresponding to the morphological information.

During this coloring, only a gray-scale image is needed to enable the coloring unit 206 to perform the coloring. However, when the input image contains, for example, an object that has the same shape as a cell nucleus and that is not a cell nucleus, there is a possibility that the object may be colored as a cell nucleus. For that reason, information obtained through the stain separation processing is used as a clue (supplementary information) for the coloring so that the accuracy of the coloring can be higher.

Figure 3:
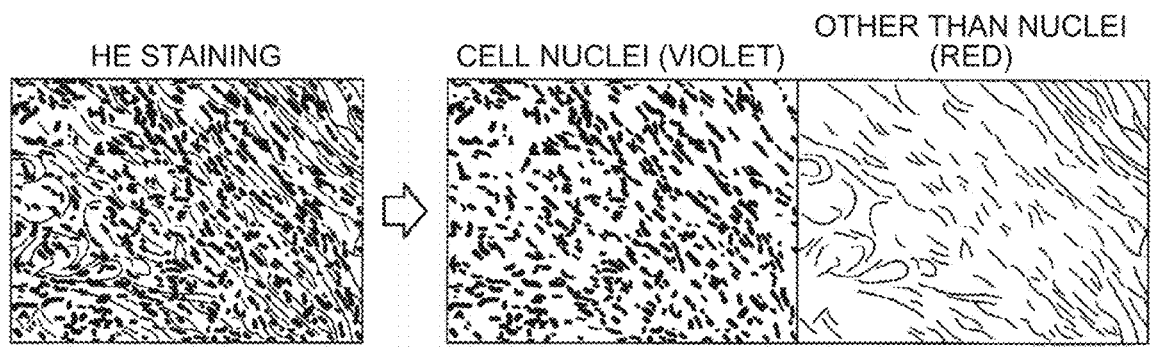
FIG. 3 schematically illustrates a separation result of a stain separation processing in which an input image is a hematoxylin-eosin (HE) image obtained through HE staining.
Figure 4:
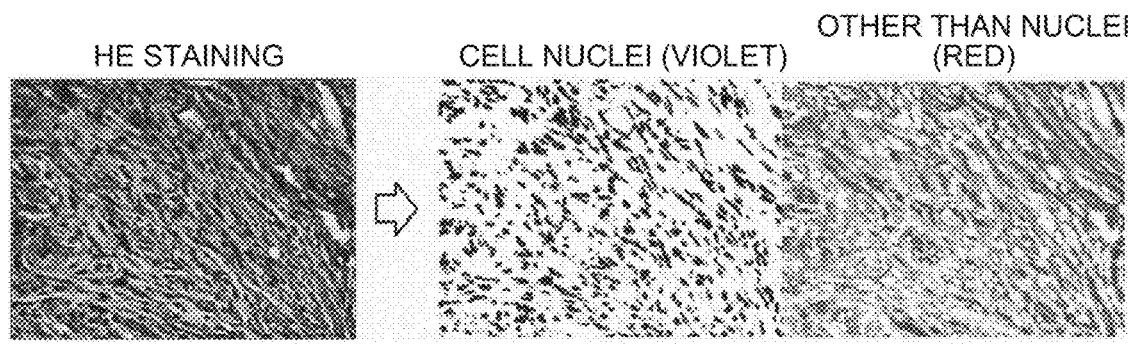
FIG. 4 schematically illustrates an actual example of a separation result of stain separation processing in which an HE image was used as an input image.

FIG. 3 schematically illustrates a result of separation by the stain separation processing when an image (referred to as hematoxylin-eosin (HE) image hereinbelow) obtained through HE staining is set to the input image. FIG. 4 illustrates an actual example of a result of separation by the stain separation processing when an HE image was used as the input image. Through HE staining, cell nuclei in an HE image are stained violet, and tissue elements therein other than cell nuclei are stained red. As illustrated in FIG. 3 and FIG. 4, the stain separation processing performed on each of the HE images separates cell nuclei into violet and areas other than cell nucleus into red.

From two or more images obtained by separation based on colors, the stain separating unit 202 extracts coordinates that can be used as a clue for coloring by the coloring unit 206. In extraction of the coordinates, a high-luminance representative point is found through threshold processing, whereby an area having high luminance that is higher than or equal to a certain threshold is extracted. Coordinates corresponding to the centroid or the center of the area are then obtained. An algorithm such as non-maximum suppression (NMS) may be used for narrowing down a detected position. Colors that are separated from one another by the stain separating unit 202, and position information on coordinates are provided as clues to the coloring unit 206, whereby highly accurate color conversion by the coloring unit 206 can be implemented. As stain vectors that are used for stain separation, those obtained from the learning-use images may be applied.

According to the stain separation processing by the stain separating unites 208, areas of cell nuclei are recognized as violet areas in FIG. 3 and FIG. 4. For this reason, when the coloring unit 206 performs the coloring, even if an area other than cell nuclei is recognized as a cell nucleus from morphological information on the gray-scale image, the coordinates of the area do not correspond to any of the coordinates of the cell nuclei from the supplementary information obtained through the stain separation processing. Thus, that area can be determined as an area other than cell nucleus. Thus, the supplementary information obtained through the stain separation processing is used for the coloring by the coloring unit 206, whereby the coloring can be performed highly accurately.

The coloring unit 206 applies colors to areas obtained through the stain separation processing by extracting the colors from an original image input to the image input unit 202. For example, if an area determined not to be an area of a cell nucleus from the morphological information has been colored as a cell nucleus through the stain separation processing, the area is colored using a color obtained from the corresponding area in the original image. Additionally, the coloring unit 206 is capable of referring to colors of the learning-use images based on areas obtained through the stain separation processing. When referring to colors of the learning-use images, the coloring unit 206 selects a color for which the distance between a stain vector in the original image and a stain vector (reference vector) in the learning-use images is small, and uses the color as supplementary information for the coloring. In such a case, the learning unit 104 is configured to previously extract stain vectors of the learning-use images. Machine learning may be used for extracting stain vectors of the learning-use images.

As described above, the process of coloring by the color converting device 200 includes: determining and storing colors of cell nuclei, other cell areas, and tissue areas of the input image with respect to each area or point; applying a digital filter to the image to decolor the image and thereby acquiring morphological or shape information; and deriving, by using color information stored with respect to each area or point, a learned color based on the morphological or shape information with respect to each area, and digitally staining the image using ideal colors. The use of stain separation processing in the process of coloring enables detection of "areas" to be automated. In the process of coloring, a "point" may be detected as the coordinates of the center or the centroid of an area obtained through stain separation or may be detected as random coordinates in the image. As described above, basically, the learning unit 104 learns only characteristic colors resulting from staining as those observed in a pathological image. For this reason, when the coloring unit 206 performs coloring, for example, if the input image has an area having a color that is not originally supposed to be developed by HE staining, the area is colored in a limited manner using a color within the range of colors that are developed by HE staining. Thus, coloring using an unexpected color can be prevented.

An image colored by the coloring unit 206 is input as an output image to the display processing unit 210. The display processing unit 210 performs processing for displaying the output image on the display apparatus 250. Operation information from a user is input to the operation input unit 212 via a mouse, a keyboard, or the like. The operation input unit 212 transmits the operation information to the display processing unit 210. Based on the operation information, the display processing unit 210 controls display contents to be displayed on the display apparatus 250. The processing by the display processing unit 210 is described below.

2. Specific Examples of Coloration Processing by System According to Present Embodiment Next, some specific examples of coloration processing (color conversion processing) by the system according to the present embodiment are described.

2.1. Color Conversion of Bright-Field Image

First, a description is given of color conversion of a bright-field image. Examples of a bright-field image include an HE image described above and an immunohistochemistry (IHC) image. Herein, an image to be used when a particular substance in tissue or a cell is specifically detected using antigen-antibody reaction based on IHC is referred to as an IHC image. The present embodiment enables color conversion processing between such bright-field images.

First, when an HE image is to be output as the output image while the input image is an HE image, color information found through the stain separation processing is retained as standard colors for the coloring. As described above, colors of areas obtained through the stain separation processing may be extracted from an original image or colors of the learning-use images may be referred to.

When images of different kinds of staining are subjected to the conversion, such as when an HE image is to be output as the output image with an IHC image used as the input image, it is desirable that standard colors be set by assigning reference colors to colors obtained through the stain separation processing. For example, when an HE image is to be output as the output image with an IHC image used as the input image, violet in an HE image is given to areas of cell nuclei as a standard color that corresponds to blue in the IHC image after the coloring because cell nuclei are stained blue in an IHC image. Thus, when an IHC image is colored and converted into an HE image, areas of cell nuclei can be colored violet. The coloring unit 206 assigns the reference colors to colors obtained through the stain separation performed by the stain separating unit 208, and then performs coloring using the reference colors as the standard colors.

As described above, stained positions are sampled in areas obtained through the stain separation processing, and the coloring is performed based on a gray-scale image after decoloring conversion and on standard color information. Color conversion of an HE image into an IHC image is also possible.

Figure 5:
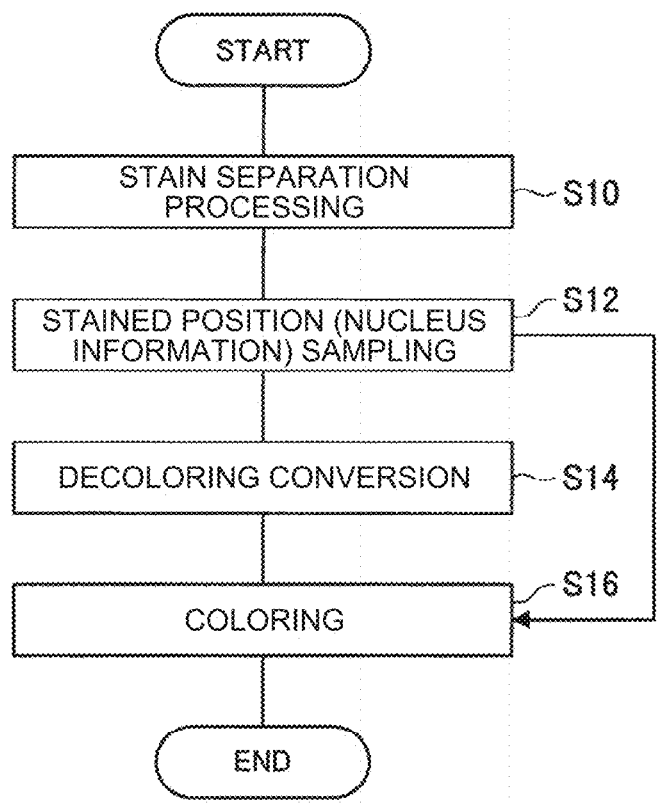
FIG. 5 is a flowchart illustrating color conversion of a bright-field image.

FIG. 5 is a flowchart illustrating color conversion of a bright-field image. First, at step S10, the stain separating unit 208 performs stain separation processing on the input image. At step S12 subsequent thereto, based on an image obtained through the stain separation, stained positions (nuclei information) are sampled. At step S14 subsequent thereto, a gray-scale image is obtained through decoloration processing (decoloring conversion) performed by the decoloring filter 204 on the input image. At step S16 subsequent thereto, the coloring unit 206 colors the gray-scale image by applying morphological information on the gray-scale image to the learning result information obtained from the learning unit 104.

Figure 6:
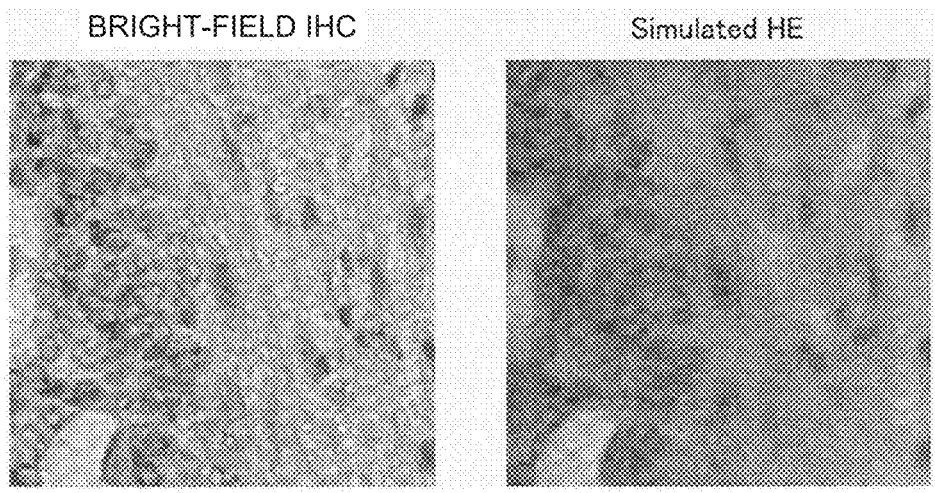
FIG. 6 illustrates an example of a case in which an immunohistochemistry (IHC) image was converted into an HE image.

FIG. 6 illustrates an example in which an IHC image was converted into an HE image (simulated HE). An IHC image represents staining using antigen-antibody reaction and, while being suitable for, for example, identifying a carcinoma cell or the like, is not necessarily always suitable for observing the shapes of cells with accuracy. In cases in which an IHC image is thus not suitable, the technique according to the present embodiment enables easy observation of the shapes of cells and the like through conversion of the IHC image into an HE image. As described above, because cell nuclei are stained blue in an IHC image, the input image that is an IHC image illustrated in the left side of FIG. 6 has cell nuclei stained blue (areas indicated as gray points in the left-side illustration in FIG. 6). An HE image after coloring that is illustrated in the right side of FIG. 6 has cell nuclei colored violet (area indicated as black points in the right side of FIG. 6) and has areas other than cell nuclei colored red. This indicates that conversion was accurately performed because the positions of cell nuclei in the HE image after color conversion correspond to the positions thereof in the original IHC image.

2.2. Color Conversion of Fluorescence Image

Next, a description is given of color conversion of a fluorescence image into a bright-field image. Examples of the color conversion include color conversion of a fluorescence image into an HE image or an IHC image. A fluorescence image of an observation target object is obtained by staining the observation target object using, for example, DAPI (4',6-diamidino-2-phenylindole) as a fluorescent dye. The fluorescence image is then sampled for nucleus information. The coloring is then performed by assigning a referential standard color to the nucleus information. The referential standard colors are violet for an HE image and blue for an IHC image.

Signals from a fluorescence image are weak, and gain adjustment therefore needs to be performed. Additionally, a gray-scale image for example has lightness and darkness inverted, and it is therefore desirable that negative-positive inversion processing be applied thereto.

Upon completion of the coloring, the same processing is performed a plurality of times equal to the number of fluorescence images, and the obtained images are superimposed. For example, in the case of multiplex staining of two or more colors as with an IHC image, it is needed to learn each of the colors, and the learning device 100 therefore needs to previously learn multiplex-stained bright-field images.

When a multiplexed (superimposed) image is handled, gain adjustment corresponding to color assignment in the respective fluorescence images needs to be performed.

Figure 7:
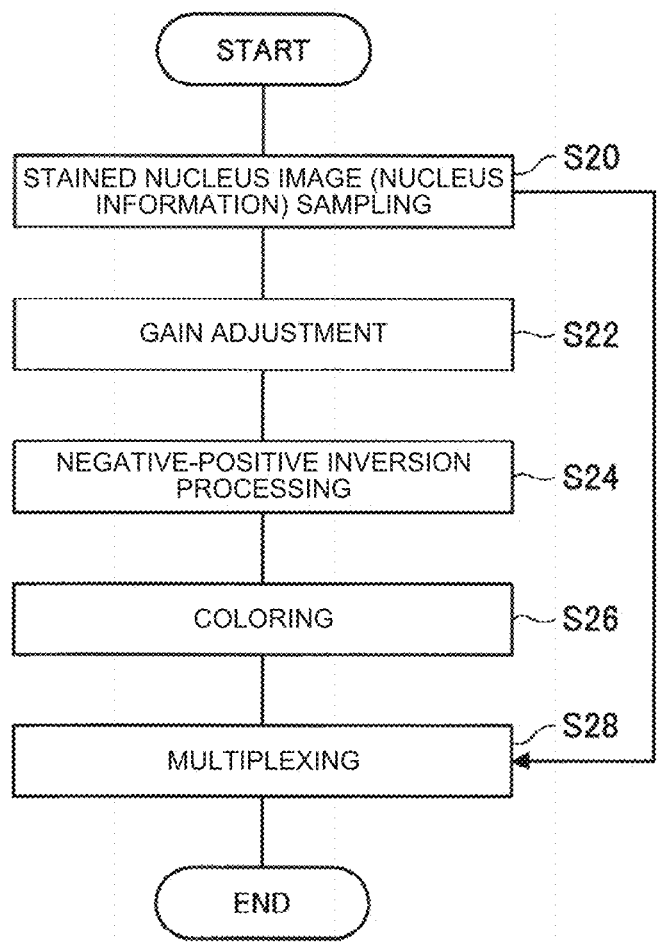
FIG. 7 is a flowchart illustrating processing for converting a fluorescence image into a bright-field image.

FIG. 7 is a flowchart illustrating processing for converting a fluorescence image into a bright-field image. First, at step S20, stained nucleus images each indicating an area in which a nucleus has been fluorescently stained are sampled. In this case, the stained nucleus images are sampled from a fluorescence image obtained by irradiating, with certain light, biological tissue stained with fluorophore. At step S22 subsequent thereto, gain adjustment is performed on the sampled images. At step S24 subsequent thereto, negative-positive inversion processing is performed.

At step S26 subsequent thereto, cell nuclei thus sampled are colored. At step S28 subsequent thereto, the images are multiplexed. In fluorescence observation performed with a plurality of stained images integrated into one image, a simulated stained bright-field image can be obtained in such a manner that a color is determined with respect to each area in fluorescence images and the coloring process is then carried out on the image obtained by the integration.

Figure 8:
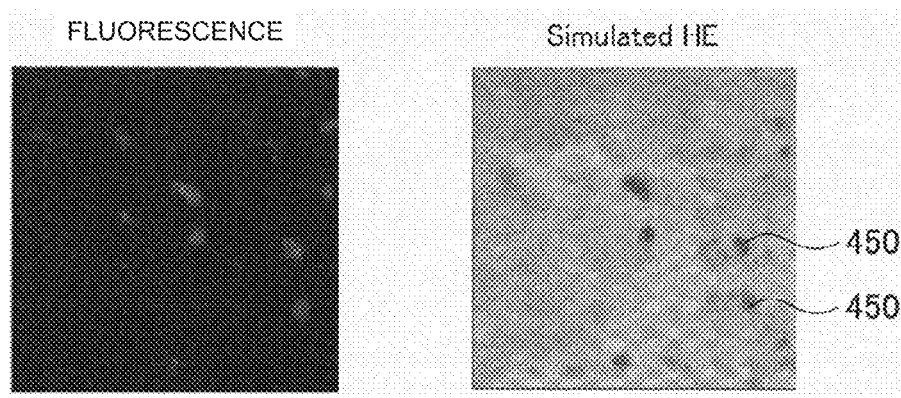
FIG. 8 illustrates an example of a case in which a fluorescence image was converted into an HE image.

FIG. 8 illustrates an example in which a fluorescence image was converted into an HE image (simulated HE). Regarding the fluorescence image, the input image illustrated in the left side of FIG. 8 that is the fluorescence image is basically a gray-scale image, and parts therein that appear white basically correspond to areas of cell nuclei. In the fluorescence image, parts corresponding to nuclei are brighter than areas surrounding these parts, and therefore are sampled as stained nucleus images. Thus, based on the shapes of sampled cell nuclei, the coloring unit 206 can color the parts corresponding to nuclei. Referring to FIG. 8, it can be seen that, in the HE image (simulated HE) obtained by converting the fluorescence image, the areas of cell nuclei that appear white in the fluorescence image are colored in the color of areas 450 of cell nuclei in the HE image. The learning device 100 does not need to learn new fluorescence images, and can convert a fluorescence image into an HE image based on learning data of HE images.

2.3. Case of Bright-Field Image for Sample Containing Artifact

A description is given here of a bright-field image for a sample that contains an artifact (artificial object or foreign object. Examples of an artifact that may be contained in a pathological stained image include an air bubble. An artifact is of very deep black color and thus can be easily distinguished from other colors. A mask image is generated through threshold processing for detecting this black color, and, for example, red (pink) out of the standard colors for HE images is assigned to an area corresponding to the artifact. The area is thereby colored with the same color as normal tissue, thus being provided with enhanced visibility. When this processing and the processing described above in "2.1. Color Conversion of Bright-field Image" are performed in combination, colors close to those of a reference image can be reproduced even in the case of a sample in which an artifact is present.

Figure 9:
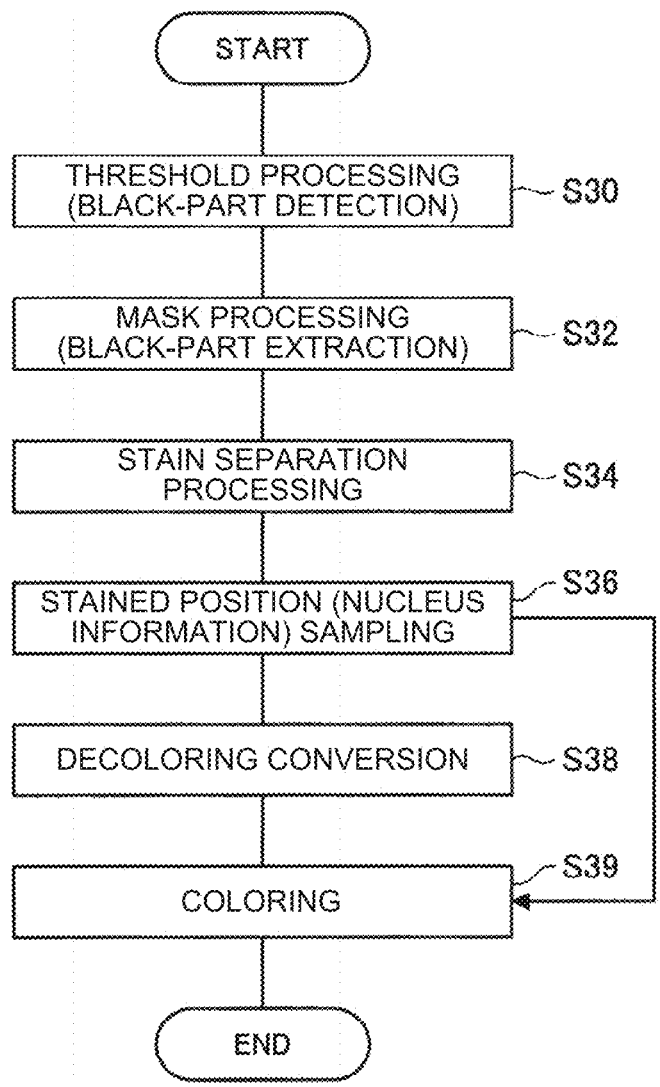
FIG. 9 is a flowchart illustrating processing for coloring a sample together with a foreign object such as an artifact when the sample includes the foreign object.

FIG. 9 is a flowchart illustrating processing for coloring a sample in the input image, together with artifacts (foreign objects), when the sample includes the foreign objects. First, at step S30, threshold processing is performed on pixel values of the input image, whereby black parts are detected. At step S32 subsequent thereto, mask processing is performed, whereby the black parts extracted in step S30 are removed. At step S34 subsequent thereto, stain separation processing is performed on the image from which the black parts have been removed.

At step S36 subsequent thereto, stained positions are sampled from an image obtained by the stain separation processing. At step S38 subsequent thereto, decoloration processing is performed on the input image, whereby a gray-scale image is obtained. At step S39 subsequent thereto, the gray-scale image is colored by applying morphological information on the gray-scale image to the learning result information obtained from the learning unit 104.

3. Examples of Display Application

Next, a description is given of examples of an application to be used when the output image is displayed on the display apparatus 250. In the present embodiment, processing performed by the display processing unit 210 enables the input image and the output image to be displayed at the same time on the display apparatus 250. For example, when an HE image is the output image while an IHC image is the input image, what is conceivably performed is to observe the IHC image for the purpose of discriminating carcinoma cells or the like and observe the HE image for the purpose of discriminating the shapes of cells.

Figure 10:
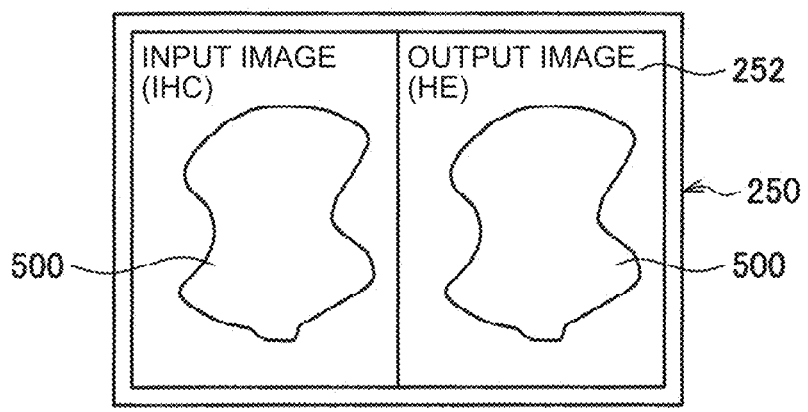
FIG. 10 is a schematic view illustrating an example of a case in which an IHC image as an input image and an HE image as an output image are displayed side by side.

FIG. 10 is a schematic view illustrating an example of a case in which an IHC image as the input image and an HE image as the output image are displayed side by side. In the example illustrated in FIG. 10, a display screen 252 of the display apparatus 250 has the IHC image as the input image displayed in the left side thereon and has the HE image as the output image displayed in the right side thereon. Thus, an observer can identify the positions of carcinoma cells from the IHC image in the left side and can identify the shapes of cells from the HE image in the right side. When a user operates a mouse or the like to input an instruction to move the images within the screen via the operation input unit 212, the display processing unit 210 moves the IHC image as the input image and the HE image as the output image in the same direction on the display screen 252. Thus, convenience during observation by the user can be enhanced.

Figure 11:
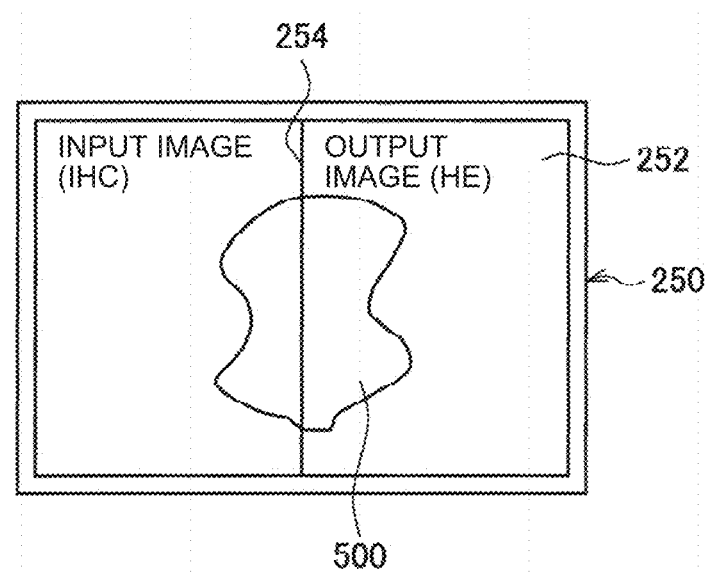
FIG. 11 is a schematic view illustrating an example of a case in which an observation target object is displayed all over a display screen while being displayed as an IHC image in the left side of the screen and as an HE image in the right side of the screen.

FIG. 11 is a schematic view illustrating an example of a case in which an observation target object is displayed all over a display screen while the observation target object is displayed as an IHC image in the left side of the screen and displayed as an HE image in the right side of the screen. A boundary 254 between the IHC image and the HE image can be moved either leftward or rightward when the user operates a mouse or the like to input information via the operation input unit 212. Displaying in a manner as illustrated in FIG. 11 enables, from a single observation target object, carcinoma cells to be identified in the left side of the screen and the shapes of cells to be identified in the right side of the screen.

Figure 12:
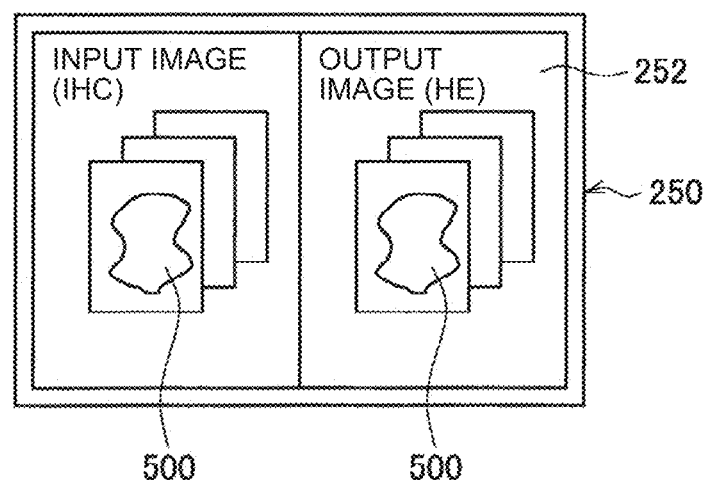
FIG. 12 is a schematic view illustrating an example of a case in which an image that has a plurality of slices in the depth direction thereof is displayed with an IHC image as an input image displayed in the left side and with an HE image as an output image displayed in the right side.

FIG. 12 is a schematic view illustrating an example of a case in which images each having a plurality of slices in the depth direction thereof are displayed with an IHC image as the input image displayed in the left side and with an HE image as the output image displayed in the right side. Respective images at the same depth position of the IHC image and the HE image have images of dark backgrounds thereof associated with each other. The user can display slices at a desired depth position of the IHC image and the HE image by inputting information from the operation input unit 212.

As described above, according to the present embodiment, coloring by the color converting device 200 enables colors of a sample to be finely reproduced even when the staining of the sample has been degraded. While tones of colors in a pathological stained image may be different by scanner, coloring by the color converting device 200 enables tones of staining to be corrected to those of preferred reference colors. Coloring by the color converting device 200 can enhance the visibility of the sample by hiding a taint of a sample. Moreover, coloring by the color converting device 200 enables a fluorescence image to be observed after being colored in such a manner as to be like a bright-field image. Furthermore, unlike the tone reproduction curve correction, each slide of an image can be individually corrected into appropriate colors.

While the preferred embodiment of the present disclosure is described in detail with reference to the accompanying drawings, the technical range of the present disclosure is not limited to that example. Obviously, a person who has ordinary knowledge in the technical field of the present disclosure can arrive at various modified examples or corrected examples without departing from the technical ideas defined in the scope of claims. It should be understood that such examples also naturally fall within the technical scope of the present disclosure.

The effects described in the present specification are merely explanatory and illustrative and are not limiting. That is, the technique according to the present disclosure can produce, together with the above effects or instead of the above effects, other effects that are apparent to the skilled person from the descriptions in the present specification.

Configurations described below also fall within the technical range of the present disclosure.

(1)

An image coloring apparatus comprising:
an acquisition unit configured to acquire a decolored image that is decolored; and
a coloring unit configured to, based on morphological information obtained from the decolored image, with reference to learning result information obtained as a result of previously learning correspondence between the morphological information and color information, color the decolored image using a color that corresponds to the morphological information.

(2)

The image coloring apparatus according to (1), wherein the acquisition unit is made up of a decoloration processing unit configured to perform decoloration processing on a colored input image.

(3)

The image coloring apparatus according to (1) or (2), wherein the learning result information is obtained as a result of learning correspondence between morphological information of a plurality of learning-use images and color information corresponding to the morphological information.

(4)

The image coloring apparatus according to (2), further comprising a stain separating unit configured to perform stain separation processing on the input image, wherein
the coloring unit performs the coloring using supplementary information obtained through the stain separation processing.

(5)

The image coloring apparatus according to (4), wherein
the supplementary information is position information on a certain part in the input image, the part being separated through the stain separation processing, and
the coloring unit colors a part that corresponds to the position information within the input image, using a color that corresponds to the part.

(6)

The image coloring apparatus according to (5), wherein the certain part is a part that corresponds to a cell nucleus.

(7)

The image coloring apparatus according to (5) or (6), wherein the coloring unit colors the certain part separated through the stain separation processing, using a color obtained from the input image.

(8)

The image coloring apparatus according to (5) or (6), wherein the coloring unit colors the certain part obtained through the stain separation processing, using a reference color obtained from the learning result information based on the stain separation processing.

(9)

The image coloring apparatus according to (2), wherein the input image is a hematoxylin-eosin (HE) image obtained through HE staining, and the coloring unit colors the input image subjected to the decoloration processing, using a color that corresponds to the HE image.

(10)

The image coloring apparatus according to (2), wherein the input image is an immunohistochemistry (IHC) image obtained through IHC staining, and the coloring unit colors the input image subjected to the decoloration processing, using a color that corresponds to a hematoxylin-eosin (HE) image obtained through HE staining.

(11)

The image coloring apparatus according to (1), wherein
the acquisition unit acquires, as the decolored image, a fluorescence image obtained by applying fluorophore to an observation target object, and
the coloring unit colors the fluorescence image, using a color that corresponds to a hematoxylin-eosin (HE) image obtained through HE staining or corresponds to an IHC image obtained through immunohistochemistry (IHC) staining.

(12)

The image coloring apparatus according to (11), wherein the coloring unit colors a plurality of images that make up the fluorescence image and superimposes the images that are thus colored.

(13)

The image coloring apparatus according to (11) or (12), wherein, before being colored by the coloring unit, the fluorescence image is subjected to gain adjustment or negative-positive inversion processing.

(14)

The image coloring apparatus according to any one of (1) to (13), wherein the coloring unit acquires a black area from the decolored image and colors the black area using a certain color that is previously determined.

(15)

The image coloring apparatus according to any one of (1) to (14), further comprising a display processing unit configured to perform processing for displaying, on a display apparatus, an image yet to be colored by the coloring unit and an image already colored by the coloring unit.

(16)

The image coloring apparatus according to (15), wherein, when a single observation target object is displayed, the display processing unit causes an image yet to be colored to be displayed for a first area of the observation target object and causes an image already colored to be displayed for a second area of the observation target object.

(17)

The image coloring apparatus according to (15), wherein the display processing unit causes an image yet to be colored and an image already colored to be displayed on a single screen and, based on operation information, causes the image yet to be colored and the image already colored to move in an identical direction.

(18)

The image coloring apparatus according to (15), wherein the display processing unit causes an image yet to be colored and an image already colored to be displayed that correspond to a certain single slice position in a depth direction, and changes the slice position to another slice position based on operation information.

(19)

The image coloring apparatus according to claim 1, wherein the image coloring apparatus colors a pathological stained image.

(20)

An image coloring method comprising:
acquiring a decolored image that is decolored; and
based on morphological information obtained from the decolored image, with reference to learning result information obtained as a result of previously learning correspondence between the morphological information and color information, coloring the decolored image using a color that corresponds to the morphological information.

(21)

A computer program that causes a computer to function as:
a unit configured to acquire a decolored image that is decolored; and
a unit configured to, based on morphological information obtained from the decolored image, with reference to learning result information obtained as a result of previously learning correspondence between the morphological information and color information, color the decolored image using a color that corresponds to the morphological information.

(22)

An image learning apparatus comprising:
a decoloration processing unit configured to perform decoloration processing on individual colored learning-use images; and
a learning unit configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

(23)

An image learning method comprising:
performing decoloration processing on individual colored learning-use images; and
learning morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

(24)

A computer program that causes a computer to function as:
a unit configured to perform decoloration processing on individual colored learning-use images; and
a unit configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon.

(25)

An image coloring system comprising:
an image learning apparatus including a decoloration processing unit and a learning unit, the decoloration processing unit being configured to perform decoloration processing on individual colored learning-use images, the learning unit being configured to learn morphological information and color information while associating the morphological information and the color information with each other, the morphological information being obtained from each one of the learning-use images after the decoloration processing is performed thereon, the color information being obtained from the one of the individual learning-use images before the decoloration processing is performed thereon; and
an image coloring apparatus including an acquisition unit and a coloring unit, the acquisition unit being configured to acquire a decolored image that is decolored, the coloring unit being configured to, based on morphological information obtained from the decolored image, with reference to learning result information obtained from the learning unit, color the decolored image using a color that corresponds to the morphological information.

REFERENCE SIGNS LIST

100 LEARNING DEVICE
104 LEARNING UNIT
106 DECOLORING FILTER
200 COLORING DEVICE
202 IMAGE INPUT UNIT

204 DECOLORING FILTER
206 COLORING UNIT
208 STAIN SEPARATING UNIT
210 DISPLAY PROCESSING UNIT

The invention claimed is:

1. A method for generating a biological image by using a learning model, the method comprising:
acquiring a decolored image; and
coloring the decolored image by using the learning model and morphological information derived from the decolored image as input information;
decoloration processing of a colored input image;
performing stain separation processing of the input image; and
performing the coloring using supplementary information obtained through the stain separation processing,
wherein the learning model associates the morphological information with color information used to color the decolored images.

2. The method according to claim 1, wherein the learning model is obtained as a result of learning correspondence between morphological information of a plurality of learning-use images and color information corresponding to the morphological information.

3. The method according to claim 1, further including acquiring, as the decolored image, a fluorescence image obtained by applying fluorophore to an observation target object and coloring the fluorescence image, using a color that corresponds to a hematoxylin-eosin image obtained through hematoxylin-eosin staining or corresponds to an immunohistochemistry image obtained through immunohistochemistry staining.

4. The method according to claim 3, further including coloring a plurality of images that make up the fluorescence image and superimposing the images that are thus colored.

5. The method according to claim 3, wherein, before being colored, the fluorescence image is subjected to gain adjustment or negative-positive inversion processing.

6. The method according to claim 1, further including acquiring a black area from the decolored image and coloring the black area using a certain color that is previously determined.

7. The method according to claim 1, further including performing processing for displaying, on a display apparatus, an image yet to be colored and an image already colored.

8. The method according to claim 7, further including, when a single observation target object is displayed, causing an image yet to be colored to be displayed for a first area of the observation target object and causing an image already colored to be displayed for a second area of the observation target object.

9. The method according to claim 7, further including causing an image yet to be colored and an image already colored to be displayed on a single screen and, based on operation information, causing the image yet to be colored and the image already colored to move in an identical direction.

10. The method according to claim 7, further including causing an image yet to be colored and an image already colored to be displayed that correspond to a certain single slice position in a depth direction and changing the slice position to another slice position based on operation information.

11. The method according to claim 1, wherein
the supplementary information includes position information on a certain part in the input image, the part being separated through the stain separation processing, and
wherein coloring the decolored image includes coloring a part that corresponds to the position information within the input image, using a color that corresponds to the part.

12. The method according to claim 11, wherein the certain part is a part that corresponds to a cell nucleus.

13. The method according to claim 11, wherein the certain part separated through the stain separation processing is colored using a color obtained from the input image.

14. The method according to claim 11, wherein the certain part obtained through the stain separation processing is colored using a reference color obtained from the learning model based on the stain separation processing.

15. The method according to claim 1, wherein the input image is a hematoxylin-eosin image obtained through hematoxylin-eosin staining, and wherein the input image subjected to the decoloration processing is colored using a color that corresponds to the hematoxylin-eosin image.

16. The method according to claim 1, wherein the input image is an immunohistochemistry image obtained through immunohistochemistry staining, and wherein the input image subjected to the decoloration processing is colored using a color that corresponds to a hematoxylin-eosin image obtained through hematoxylin-eosin staining.

17. An image coloring method comprising:
acquiring a decolored image;
based on morphological information obtained from the decolored image, with reference to learning result information obtained as a result of previously-determined learning correspondence between the morphological information and color information, coloring the decolored image using a color that corresponds to the morphological information;
decoloration processing of a colored input image;
performing stain separation processing of the input image; and
performing the coloring using supplementary information obtained through the stain separation processing.

* * * * *